3,092,551
MEDICATION FOR PSYCHIC DISTURBANCES

Gilbert Ancel, Neuilly-sur-Seine, France, assignor to Société d'Études Scientifiques et Industrielles de l'Ile-de-France, Paris, France, a society of France
No Drawing. Filed Aug. 15, 1961, Ser. No. 131,482
Claims priority, application France Mar. 20, 1961
2 Claims. (Cl. 167—65)

The present invention relates to a medication in injection form for psychic disturbances acting rapidly on the psychomotric agitation and in which the active element is 1-ethyl-1-methyl-propyl carbamate having the following formula:

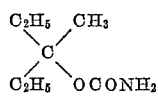

The preparation of this compound, also known under the name of emylcamate, is made by first preparing phenyl chlorcarbonate by reacting phosgene with phenol which is then reacted in an autoclave with 1-ethyl-1-methyl propanol in the presence of liquid ammonia. The 1-ethyl-1-methyl-propyl carbamate is thus directly obtained.

When administered orally for treatment of ethylic neurosis, it was observed that 1-ethyl-1-methyl-propyl carbamate presents a greater activity than 2-methyl-2-N-propyl-1,3-propanediol dicarbamate. These qualities of 1-ethyl-1-methyl-propyl carbamate, however, are not sufficient enough to permit its use in cases of violent psychomotric disturbances needing to be calmed quickly which is notably the case in a crisis of tremens delirium.

A form of 1-ethyl-1-methyl-propyl carbamate assuring its rapid action has been sought for since a long time back and the form naturally considered was by injection. As there is not any question of injecting it in aqueous solution form given the low solubility of 1-ethyl-1-methyl-propyl carbamate in water (4 gms. per liter at 20° C.), the solvents of 1-ethyl-1-methyl-propyl carbamate were then considered. None of the solvents of a high dissolution quotient is acceptable for human therapy for which a suspension of 1-ethyl-1-methyl-propyl carbamate in carboxymethylcellulose also presents no interests. Outside of these general solvents, tests tried by the applicant have shown, besides, that dissolution in propylene glycol brings about great pain during the injection thus rendering intolerable a treatment repeated various times per day.

Following up his researches, the applicant then observed it possible to dissolve strong proportions of 1-ethyl-1-methyl-propyl carbamate in isopropyl propylene glycol ether having the following formula iso $C_3H_7$—$OCH_2$—$CHOH$—$CH_3$ as shown in the following table

| Concentration | Temperature | |
|---|---|---|
| | 5° | 20° |
| 40 g./100 cc | soluble | soluble. |
| 50 g./100 cc | insoluble | Do. |
| 60 g./100 cc | do | insoluble. |

Solutions having concentrations of 50 g./100 cc. gelify at 5° but spontaneously return to the liquid state at 20°.

The medication is produced by direct mixture of the two constituents.

It is well to remember at this time the general properties resulting from the pharmacological study of 1-ethyl-1-methyl-propyl carbamate as done before by oral administration, the only method up to now considered practical.

The low toxicity of this compound, it must be thus kept in mind, was shown by studies on acute toxicity of rats and mice.

Orally LD 50:         Mg./kg.
  Mouse _____ 873
  Rat _____ 948

Tolerance tests on rats have shown the daily absorption of 200 mg./kg. during 6 weeks to be well tolerated.

Chronic and subacute toxicity tests of various animals can be thus summarised:

| Animal | Minimum tolerated dosage in mg./kg./day | Means of introduction | Duration |
|---|---|---|---|
| Dog | 200 | orally | 1 month. |
| Rat | 400 | do | Do. |
| Mouse | 25 | intraperitoneal | Do. |
| Rabbit | 100 | orally | 10 months. |

During the pharmacological studies, meprobamate, also known as 2-methyl-2-N-propyl-1,3-propanediol dicarbamate, was used as a comparison control.

Spontaneous motility studies on results observed 1 hour after the absorption of the product given in a 50 mg./kg. dosage, it must be equally kept in mind, showed a 63% decrease of motility to the advantage of 1-ethyl-1-methyl-propyl carbamate as against a decrease of only 32% to the advantage of 2-methyl-2-N-propyl-1,3-propanediol dicarbamate, the 2-methyl-2-N-propyl-1,3-propanediol dicarbamate being used as a comparison control.

1-ethyl-1-methyl-propyl carbamate, it should be kept in mind, has a powerful muscular relaxing effect as shown in the following table which condenses the results on the study of the AD 50 and the LD 50 as well as on the latency time between injection and appearance of the lateral position:

| Product | AD 50, mg./kg. | LD 50, mg./kg. | Number of mice | Therapeutic index | Latency time, min. |
|---|---|---|---|---|---|
| 1-ethyl-1-methyl-propyl carbamate | 125 | 550 | 110 | 4.4 | 3 |
| 2-methyl-2-N-propyl-1,3-propanediol dicarbamate | 175 | 600 | 110 | 3.4 | 35 |

Finally, the anticonvulsive effect of 1-ethyl-1-methyl-propyl carbamate, given before the injection of convulsive agents such as strychnine and pentamethylenetetrazol, gives the following results:

| Product | Dosage | (a) Strychnine, 0.60 mg./kg. I.V. mortality rate at the end of— | |
|---|---|---|---|
| | | 2 min. | 30 min. |
| Control | | 9/10 | 9/10 |
| 1-ethyl-1-methyl-propyl carbamate | 25 | 9/10 | 9/10 |
| | 50 | 6/10 | 6/10 |
| | 75 | 4/10 | 4/10 |
| | 100 | 2/10 | 2/10 |
| | 125 | 1/10 | 1/10 |
| 2-methyl-2-N-propyl-1,3-propanediol dicarbamate | 25 | 10/10 | 10/10 |
| | 50 | 9/10 | 9/10 |
| | 75 | 9/10 | 9/10 |
| | 100 | 3/10 | 3/10 |
| | 125 | 1/10 | 1/10 |

(b) *Pentamethylenetetrazol.*—As with the strychnine tests, the products were given 3 and 35 minutes respectively before the convulsive agent.

| Product | Dosage mg./kg. intraperitoneal | Number of convulsions per 10 mice during 10 minutes |
| --- | --- | --- |
| 1-ethyl-1-methyl-propyl carbamate | 60 | 10 |
|  | 75 | 2 |
|  | 90 | 0 |
| 2-methyl-2-N-propyl-1, 3-propanediol dicarbamate. | 75 | 18 |
|  | 100 | 10 |
|  | 125 | 0 |

With electroshock treatment, 10 mice were simultaneously electroshocked and with 1-ethyl-1-methyl-propyl carbamate the following results were obtained:

| Product | Dosage, mg./kg. intraperitoneal | Number of animals put in the state of convulsion |
| --- | --- | --- |
| Controls |  | 40/40 |
| 1-ethyl-1-methyl-propyl carbamate | 100 | 8/10 |
|  | 150 | 0/10 |
| 2-methyl-2-N-propyl-1, 3-propanediol dicarbamate. | 100 | 8/10 |
|  | 150 | 5/10 |

The clinical studies of 1-ethyl-1-methyl-propyl carbamate administered orally showed it to be a powerful tranquilizer respecting precision in gests and skills and having none of the secondary effect found in other similar tranquilizing products, giving neither observed anomalies of the blood formula nor visceral reverberations.

Clinical tests performed by the applicant using a solution in injection form of 1-ethyl-1-methyl-propyl carbamate and isopropyl propyleneglycol ether first showed the said product to be well tolerated by dogs; for, by injecting into a new animal weighing 9.5 kg. an ampulla containing 0.50 gr. of 1-ethyl-1-methyl-propyl carbamate and a sufficient quantity for a final volume of 1 cc. of isopropyl propyleneglycol ether, no other reactions but a brief loss of consciousness and motor-incoordination were noted. On the other hand, the injection of isopropyl propyleneglycol ether (1 cc. per 8.5 kg.) was very well tolerated by another dog used as control.

In human therapy, 14 patients underwent a treatment of 1-ethyl-1-methyl-propyl carbamate dissolved in isopropyl propyleneglycol ether administered parenterally or intravenously as well as intramuscularly. It was observed that 1-ethyl-1-methyl-propyl carbamate in injection form under the invention conditions is very well tolerated and that intramuscularly it is put into use with facility.

(1) *Local tolerance* of 1-ethyl-1-methyl-propyl carbamate appears to be perfect: no pain at the injection point, no objective sign of local irritation.

(2) *General tolerance* appears to be equally perfect, for daily doses of 0.50 to 1.50 g. per 24 hours at a variable duration of 3 days to 7 weeks: no albuminuria, no blood formula modification, no anomalies of any of the biological constances. One of the fourteen patients entered with a clinical syndrome and complete biology of icterus gravis during a cirrhosis developed to death.

(3) *Therapeutic efficiency.*—Of the 14 patients treated, there were only two failures, both having characterized psychotic disturbances one with asocial and psychataxic mental deficiency along with exhibitionism treated several times in psychiatric services, and the other with hypochondriac psychosis along with paranoical delirium.

1-ethyl-1-methyl-propyl carbamate appeared to be inadequate for both these two subjects, the first having to be confined, the second being released a few days later at his own request.

Noted in all the other cases:
A very rapid and constant action,
A manifest sedation of psychomotric agitation,
The effect appears to be particularly remarkable, in the predeliriums and the ethylic deliriums, at least equal in its intensity as by the chlorpromazine treatment, clearly superior by its excellent tolerance, absence of a tension drop, a better consciousness control.

In conclusion, the solution in injection form prepared according to the invention has given spectacular results, while by oral administration in the form of pills these results have never been either obtained or even suggested.

Intramuscular administration by preference in ampulla form:

1-ethyl-1-methyl-propyl carbamate _____ mg__ 500
Isopropyl propyleneglycol ether, q.s.p. _____ cc__ 1 at the rate of 1 to 3 ampullae per day according to attending physician's prescription.

What I claim is:

1. An injection form medication for psychic disturbances comprising a solution of 1-ethyl-1-methyl-propyl carbamate having the formula:

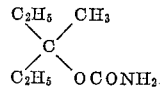

in isopropyl propyleneglycol ether.

2. A tranquilizing medication in injection form for psychic disturbances comprising 500 mg. of 1-ethyl-1-methyl-propyl carbamate dissolved in 1 cc. of isopropyl propyleneglycol ether.

References Cited in the file of this patent

Melander: J. of Med. and Pharm. Chem., vol. 1, No. 5, pp. 443–457, 1959.